United States Patent
Axelrod

[11] Patent Number: 6,093,441
[45] Date of Patent: *Jul. 25, 2000

[54] HEAT MODIFIABLE PEANUT DOG CHEW

[75] Inventor: Glen S. Axelrod, Mahwah, N.J.

[73] Assignee: TFH Publications, Inc., Neptune City, N.J.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 09/116,555

[22] Filed: Jul. 15, 1998

[51] Int. Cl.[7] .................. A23L 1/38; A23K 1/18
[52] U.S. Cl. .......... 426/632; 462/630; 462/635; 462/805
[58] Field of Search .................. 426/632, 630, 426/635, 805

[56] References Cited

U.S. PATENT DOCUMENTS

| | | | |
|---|---|---|---|
| 3,821,446 | 6/1974 | Estey et al. | 426/373 |
| 3,899,607 | 8/1975 | Miller et al. | 426/285 |
| 4,171,383 | 10/1979 | Chwalek et al. | 426/623 |
| 4,310,558 | 1/1982 | Nahm, Jr. | 426/98 |
| 4,315,034 | 2/1982 | Levinson et al. | 426/104 |
| 4,419,372 | 12/1983 | Greene et al. | 426/104 |
| 4,735,808 | 4/1988 | Scaglione et al. | 426/62 |
| 4,784,860 | 11/1988 | Christensen et al. | 426/46 |
| 4,800,099 | 1/1989 | Gellman et al. | 426/641 |
| 4,886,440 | 12/1989 | Forrest et al. | 425/208 |
| 4,892,748 | 1/1990 | Andersen et al. | 426/635 |
| 4,997,671 | 3/1991 | Spanier | 426/646 |
| 5,000,973 | 3/1991 | Scaglione et al. | 426/549 |
| 5,094,870 | 3/1992 | Scaglione et al. | 426/549 |
| 5,200,212 | 4/1993 | Axelrod | 426/2 |
| 5,240,720 | 8/1993 | Axelrod | 426/2 |
| 5,296,209 | 3/1994 | Simone et al. | 424/49 |
| 5,419,283 | 5/1995 | Leo | 119/709 |
| 5,476,069 | 12/1995 | Axelrod | 119/709 |
| 5,591,491 | 1/1997 | Ando | 427/544 |

FOREIGN PATENT DOCUMENTS

| | | |
|---|---|---|
| 337573 | 4/1988 | European Pat. Off. |
| 2705864 | 6/1993 | France . |
| 3701861 | 8/1988 | Germany . |
| 19501142 | 7/1995 | Germany . |

Primary Examiner—Chhaya D. Sayala
Attorney, Agent, or Firm—Hayes, Soloway, Hennessey, Grossman & Hage P.C.

[57] ABSTRACT

A completely digestible highly nutritious dog chew formulated primarily of peanut flour, casein and a vegetable starch carbohydrate, the texture of hardness of which is easily modified to suit a particular dog by the dog owner. By irradiating the chew in a microwave oven, the chew is caused to expand and is thereby rendered more easily chewable.

10 Claims, 1 Drawing Sheet

HEAT MODIFIABLE PEANUT DOG CHEW

BACKGROUND OF THE INVENTION

1. Field of the Invention

The present invention relates to dog chews, and more particularly, pertains to a peanut, casein and starch-based completely digestible, nutritious dog chew, the texture or hardness of which is easily heat modified to suit a particular dog.

2. Brief Description of the Prior Art

Most dogs enjoy chewing on things although preferences vary as to the hardness of the substances favored. Some dogs like to chew on very hard materials such as cow bones, wood, nylon, others prefer softer chews such as polyurethane or rubber while still others favor freeze dried snacks. Some dogs, due to their age, may not be able to chew on the very hard substances. Young dogs have insufficiently developed teeth, while old dogs may have diseased gums or may have lost some of their teeth.

Many indigestible objects are given to dogs as a chew and although the dogs may enjoy chewing thereon, the objects are often swallowed in whole or in part. Once swallowed, these objects or fragments thereof can have an adverse effect on the dogs digestion and can become impacted in the dog's intestinal tract with life-threatening consequences. By way of example, dog chews have been marketed which utilize an ethylene copolymer which can be fractured by the chewing action of a dog, and when ingested can block the dog's stomach passages.

Other edible dog chews have been marketed which have a comparatively short shelf life and therefore must be replaced by retail outlets at frequent intervals. Yet other prior art dog chews are lacking in structural integrity whereby they are susceptible to breakage during handling and shipping.

Applicant's assignee T.F.H. Publications, Inc. has previously developed an edible dog chew that is wholly digestible, nutritious and having a texture or hardness which is individually adjustable by the application of heat to suit a wide variety of dog's preferences or needs. Such dog chews utilize a mixture containing primarily casein and are disclosed in Herbert R. Axelrod U.S. Pat. Nos. 5,200,212 and 5,240,720. Such dog chews, while constituting a major improvement over other prior art edible dog chews, do not provide all the advantages of the dog chew of the present invention.

SUMMARY OF THE INVENTION

The present invention provides an edible dog chew that is completely digestible, nutritious, devoid of deleterious additives and of a modifiable texture or hardness that is quickly and easily tailorable by the owner to suit the need or preference of a particular dog. In addition, such edible dog chews have a long shelf life as compared to prior edible dog chews. The chews are extremely rugged so as to be able to withstand shocks resulting from shipping and handling. Upon removal from the chew's package, the chew can be caused to swell up to four to eight times its original volume, if desired, by subjecting it to microwave radiation. With this procedure, the chew's texture or hardness can be adjusted to any magnitude from its original high density extremely hard state to a low density expanded easily chewed state depending upon the amount of microwave exposure to which it is subjected. Accordingly, the chew can thereby be quickly and easily to the texture preference of a wide variety of dogs from a strong large healthy dog to a small puppy with puppy teeth or an older dog with decayed molars. Additionally, the dog chew of the present invention is biodegradable which is important should a dog bury the bone.

Other features and advantages of the present invention will become apparent from the following detailed description taken into conjunction with the accompanying drawings which illustrate by way of example the principles of the invention.

DETAILED DESCRIPTION OF A PREFERRED EMBODIMENT

A preferred form of edible dog chew of the present invention has as a combination of basic ingredients, water, peanut flour, casein and a vegetable starch material. The peanut flour can be obtained by roasting peanuts to a temperature of between 250° F. and 325° F. After roasting, the peanuts may be pressed to extract the oil from the peanuts, with the peanuts then being ground to obtain a peanut flour. Casein is a protein derived from milk and is highly nutritious and easily digested by dogs. The starch is a carbohydrate (humectant) and can be obtained from a vegetable such as potatoes, corn or a mixture thereof. A preferred ratio of peanut flour, casein and starch is about 50% by weight, peanut flour about 45% by weight casein and about 5% by weight of vegetable starch carbohydrate. To the peanut flour, vegetable starch and casein mixture a dog attractant may be added, such as chicken powder, liver powder, ham, turkey, beef, and/or fish in the amount of about 1 to 5% by weight. Natural vegetable or cereal additives such as oats and spinach or carrots may also be added in the amount of about 1 to 5%. Gelatin in an amount of 1 to 5% may be added to the mixture so as to effect the hardness of the chew, the higher the gelating content, the softer the chew.

In order to cause the above described ingredients vegetable or cereal additives and gelatin, and water to be intimately combined with one another, the mixture of peanut flour, vegetable starch, casein and dog attractant is heated to melting temperatures of the ingredients under pressure into a desired form, such as a dog bone. Molding can be accomplished in an injection molding machine at temperatures between 250° to 400° F. and pressures of 1000 to 2500 PSI depending upon the injection molding machine utilized, the location of the materials within the molding machine, the type of additives, the particular mold, and the size of the bone being molded. Adjustment of the mixtures' moisture content may be accomplished either by heating to drive-off excess moisture or steam injection to increase moisture before the molding step. The moisture content may vary between 20% to 30%. After the molding step, the chew can be dried to about 11–13% moisture content and packaged in moisture-proof packing if desired to preserve the moisture content of the chew at between 11% to 13%. Higher or lower moisture content can affect the shelf life of the chew. Too much moisture causes the chew to deteriorate without the addition of stabilizers. Less than 10% moisture level can render the chew hygroscopic and brittle.

Figure 1:
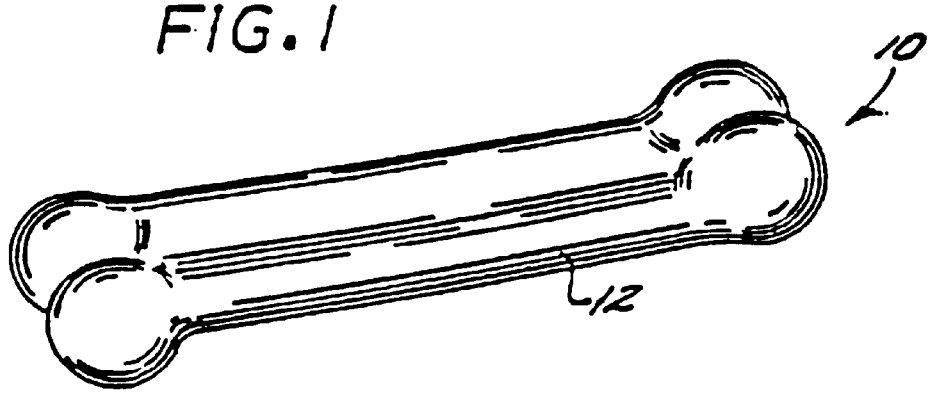
FIG. 1 illustrates a preferred embodiment of an edible dog chew embodying the present invention in its unexpanded state.
Figure 2:
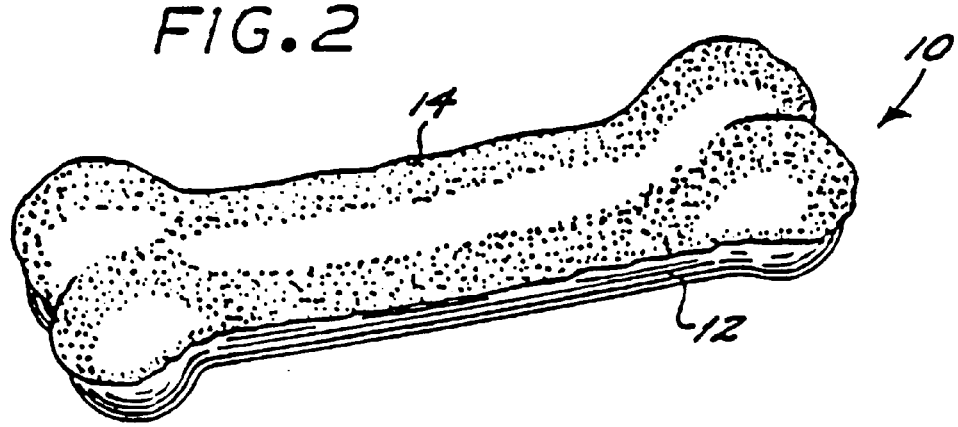
FIG. 2 illustrates the dog chew of FIG. 1 in its partially expanded state.
Figure 3:
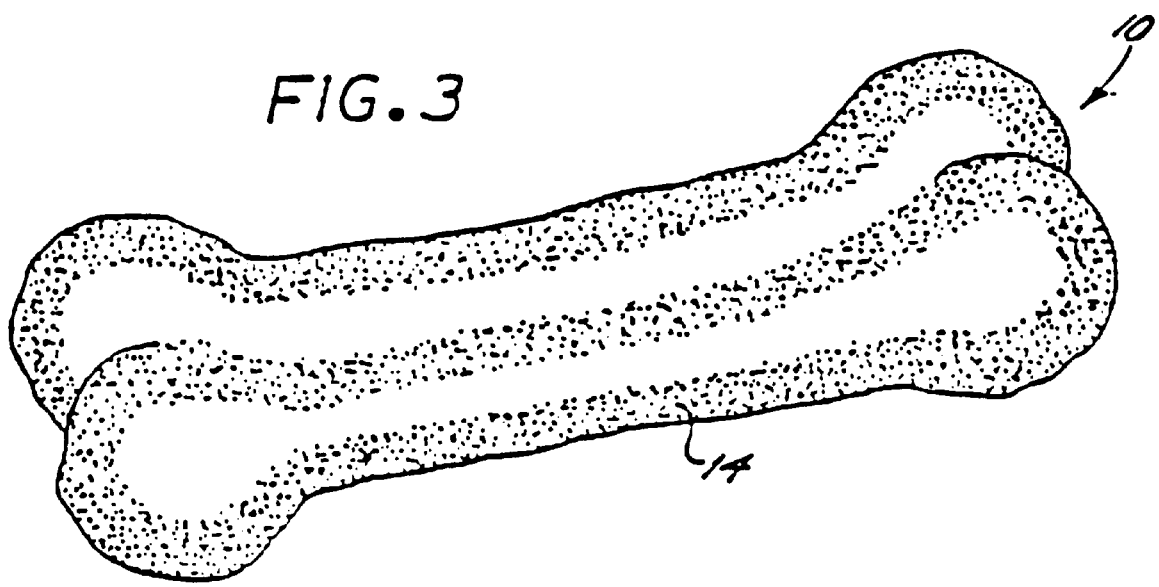
FIG. 3 illustrates the dog chew of FIG. 1 in its fully expanded state.

Upon removal from the package, the person feeding the dog can modify the texture or hardness of the molded chew by heating, preferably in a microwave oven. The expansion of the moisture within the chew causes the chew to expand. Subjecting the chew to microwave radiation facilitates the heating of areas deep within the chew at the same time the exterior heats up and expands. FIG. 1 illustrates the chew 10 prior to heating, in which state it has a substantially smooth exterior surface 12 and is of an extremely hard texture preferred by some dogs. A short exposure to microwave radiation initiates the expansion process. FIG. 2 illustrates the chew 10 in a partially expanded state evidenced by partially bubbled surface 14. In this state the chew 10 is of an intermediate hardness preferred by other dogs. FIG. 3 illustrates the chew 10 in a fully expanded state as may result from a 25 seconds to 1 minute exposure in a standard household microwave oven, depending upon the size of the bone and the power setting of the oven. The entire chew 10 has a bubbled surface 14 and is easily chewable by most dogs. The chew in this state is ideal for small dogs with puppy teeth or old dogs who suffer from gum disease or may have lost teeth. Sufficient exposure to microwave radiation will cause the chew to expand up to about 4 to 8 times its original volume with a commensurate reduction in hardness.

In use, the chew is given to the dog in its initial hardness state. If the dog is unwilling or is unable to chew on it, the chew is microwaved for short time increments and re-offered to the dog until the chew reaches a state of expansion and degree of hardness preferred by the dog. Large, strong and healthy dogs would probably prefer the chew in its unmodified and hardest state, while very small, young or very old dogs would prefer the chew in its most expanded state.

It should be particularly noted that an edible dog chew made in accordance with the present invention does not dry out and fall apart after being packaged and accordingly can have a shelf life of several years without being packaged in a waterproof container. Additionally, the dog chew is extremely resistant to breakage during shipping and handling.

While a particular form of the invention has been illustrated and described it will be apparent to those skilled in the art that various modifications can be made without departing from the spirit and scope of the invention. Accordingly, it is not intended that the invention be limited except as by the appended claims.

What is claimed is:

1. A method of producing a hardness-adjustable edible dog chew, consisting essentially of the steps of forming a mixture consisting essentially of peanut flour, casein, and a vegetable starch carbohydrate as a humectant, and adjusting the water content of said mixture to about 20–30 wt-%; and injection molding such mixture into the shape of the dog chew, wherein said water content, subsequent to injection molding, is reduced below said 20–30 wt %, and packaging said dog chew wherein the hardness of said chew can be modified by microwave heating.

2. The method of claim 1 wherein said vegetable starch comprises potato, corn or a mixture thereof.

3. The method of claim 1 wherein the moisture content subsequent to injection molding is adjusted to about 11–13% by weight.

4. The method of claim 1 wherein said peanut flour is obtained by heating peanuts to a temperature of about 250° F. to 325° F. and pressing said peanuts to extract oil therefrom.

5. The method of claim 1 wherein said casein is derived from milk.

6. The method of claim 1 wherein said mixture contains about 50% peanut flour, 45% casein, and about 5% vegetable starch carbohydrate.

7. The method of claim 1, wherein said mixture also contains an attractant.

8. The method of claim 7 wherein said attractant is selected from the group consisting of chicken powder, liver powder, ham, turkey, beef, fish, or mixtures thereof.

9. The method of claim 1 wherein said mixture further contains 1–5% by weight of a cereal additive.

10. The method of claim 1 wherein the mixture is injection molded at a pressure of about 1000–2500 psi and at a temperature of about 250–400° F.

* * * * *